United States Patent [19]
Orr et al.

[11] Patent Number: 5,772,055
[45] Date of Patent: Jun. 30, 1998

[54] ROTATABLE DISPLAY TOWER

[75] Inventors: Henry C. Orr, Syracuse; James R. Dokoupil, Liverpool; Robert W. Ackley, Chittenango; Linda Lewis; Jerome A. Dubos, both of Syracuse; Donald J. Crispin, N. Syracuse; Robert D. Lindridge, Binghamton, all of N.Y.

[73] Assignee: The Croydon Company, Inc., Liverpool, N.Y.

[21] Appl. No.: 735,078

[22] Filed: Nov. 18, 1996

[51] Int. Cl.$^6$ .................................................. A47B 47/00
[52] U.S. Cl. ...................... 211/186; 211/144; 211/41.12; 108/180; 108/153.1
[58] Field of Search ................................ 211/41.12, 186, 211/144, 131.1, 169; 108/180, 183, 193, 153.1

[56] References Cited

U.S. PATENT DOCUMENTS

| | | |
|---|---|---|
| 1,729,956 | 10/1929 | McVeigh . |
| 2,926,788 | 3/1960 | Jacobson ...................................... 211/4 |
| 3,069,216 | 12/1962 | Vaeth ................................... 211/186 X |
| 3,844,230 | 10/1974 | Hudson et al. ...................... 211/163 X |
| 3,885,358 | 5/1975 | Marschak ................................ 211/186 |
| 4,269,124 | 5/1981 | Rosenthal et al. ...................... 108/103 |
| 4,438,853 | 3/1984 | Numbers ............................. 211/163 X |
| 5,101,738 | 4/1992 | Sideris ..................................... 108/94 |
| 5,117,989 | 6/1992 | Ross ........................................ 211/144 |
| 5,226,548 | 7/1993 | Koeppel .............................. 211/169 X |
| 5,253,594 | 10/1993 | Sideris ..................................... 108/94 |
| 5,253,767 | 10/1993 | Koeppel ................................... 211/40 |
| 5,383,562 | 1/1995 | Gay ........................................ 211/181 |
| 5,397,005 | 3/1995 | Taccolini .................................. 211/70 |

FOREIGN PATENT DOCUMENTS

| | | |
|---|---|---|
| 74107 | 5/1952 | Denmark . |
| 2415441 | 9/1979 | France ..................................... 211/186 |
| 455414 | 3/1950 | Italy ........................................ 211/186 |

*Primary Examiner*—Blair Johnson
*Attorney, Agent, or Firm*—George R. McGuire

[57] ABSTRACT

The present invention provides a rotatable tower for holding and displaying books, video cassettes, and like articles on a plurality of square shelves which extend in horizontal planes and are supported in vertically spaced relation to one another by a plurality of vertically extending rods, groups of which are interconnected into L-shaped configurations by L-shaped, horizontally extending rods. The shelves include an elongated slot formed from the midpoint of each edge inwardly towards the shelves' geometric center, and two laterally spaced notches formed in each edge to one side of the slot. Each edge of the shelves includes a downwardly extending flange along their entire lengths and an upwardly extending flange along a portion of the length to the opposite side of the slot in which the notches are formed. Each L-shaped group of vertically extending rods is comprised of four rods, two rods forming each leg of the L. The rods in each group are spaced from one another a distance corresponding with the length and spacing of the slot and notches formed in each edge, thereby permitting one group of rods to engage the slot and notches formed in each edge of each shelf. Each shelf can be slid downwardly on the rods until they engage the adjacent horizontally extending L-shaped rods which interconnect the vertically oriented rods. The shelves' downwardly extending flanges will prevent the horizontally oriented rods, and hence the vertically oriented rods, from becoming disengaged from the shelves. Moreover, the engagement of one set of L-configured rods with each edge of each shelf systematically divides each shelf into four distinct article supporting regions.

32 Claims, 6 Drawing Sheets

ROTATABLE DISPLAY TOWER

BACKGROUND OF THE INVENTION

The present invention generally relates to rotatable towers for connection with the display of books, video cassettes, compact disks, and the like, and more particularly to a modular assembly of independently rotatable display towers.

Rotatable display towers have been used in the past by libraries and stores for the purpose of displaying or merchandising a large quantity of books, video cassettes, cards, tapes, disks, and the like in a minimal amount of space. The towers generally include a centrally positioned, vertically extending pole about which the tower rotates, and from which a plurality of shelves or other article supports, positioned in vertically spaced relation to one another, radially extend. A frame or base is the typical structure to which a tower is rotatably mounted for providing stability thereto.

Generally, each base or frame rotatably supports a single tower, although some may support at least four towers. Regardless of the number of towers supported by a base or frame, the stability with which a tower supports articles and rotates is of great importance considering the units are intended to be used a great deal by people in the libraries or stores. Accordingly, the structural attributes of the display towers are critical to their marketability.

Most towers are constructed of similar, strong, rigid materials, thereby not making one tower significantly more stable than any other on this basis. The differences in stability become apparent in the manners in which the towers are assembled. Prior art towers are generally all assembled by rotatably mounting a vertical post to a base, and then attaching the article support members to the post with nuts and bolts, or other mechanical connectors. Although nuts and bolts are relatively inexpensive on a per unit basis, and fairly easy for a worker to use to complete the assembly, they do loosen fairly rapidly. If the loosening is not attended to by an employee of the library or store where the tower is located, the article supports will become less stable and will eventually fail. If the loosening is attended to, it does take an employee's time to make the adjustments, thereby increasing labor costs or decreasing worker efficiency of the establishment owner of the tower.

Some display towers, however, have their article supports welded to the central post to increase rigidity and stability of the unit. Although welding may provide a solution to the drawbacks of the conventional nut and bolt assembly, it is a specialized, expensive process. Moreover, unless it is done by a highly skilled welder, the welded product is, in most instances, aesthetically displeasing. Considering the aesthetics of the towers is an important sales consideration, a highly skilled welder would most likely need to be employed, thereby adding additional labor cost to an already expensive process. This increased labor cost will in turn result in increased product cost, without an increased margin, which will inevitably decrease sales and profitability.

It is therefore a principal object of the present invention to provide a rotatable display tower that is of high durability and stability.

It is another object of the present invention to provide a rotatable display tower that is easily and quickly assembled with a minimum amount of hardware.

It is a further object of the present invention to provide an aesthetically pleasing rotatable display tower.

It is an additional object of the present invention to provide an assembly of modular display towers which permit customized, easily changeable tower configurations, thereby increasing its versatility.

It is still another object of the present invention to provide a rotatable display tower that is inexpensive to manufacture.

Other objects and advantages of the present invention will in part be obvious and in part appear hereinafter.

SUMMARY OF THE INVENTION

In accordance with the foregoing objects and advantages, the present invention provides a rotatable tower for holding and displaying books, video cassettes, and like articles on a plurality of square shelves which extend in horizontal planes and are supported in vertically spaced relation to one another by a plurality of vertically extending rods, groups of which are interconnected into L-shaped configurations by L-shaped, horizontally extending rods. Each of the shelves includes an elongated slot formed from the midpoint of each edge inwardly towards the shelves' geometric center, and two laterally spaced notches formed in each edge to one side of the slot. In addition, each edge of the shelves includes a downwardly extending flange along their entire lengths and an upwardly extending, retaining flange along a portion of the length to the opposite side of the slot in which the notches are formed. The upwardly extending, retaining flange is appropriately positioned to prohibit the articles supported on the shelves from unimpededly sliding off the shelves, as the articles' bottom edges will abut the flange absent any lifting force applied to the articles.

Each L-shaped group of vertically extending rods is comprised of four rods, two rods forming each leg of the L. The rods in each group are spaced from one another a distance corresponding with the length and spacing of the slot and notches formed in each edge, thereby permitting one group of rods to engage the slot and notches formed in each edge of each shelf. Once the rods are engaged with the shelves, each shelf can be slid downwardly on the rods until they engage the adjacent horizontally extending L-shaped rods which interconnect the vertically oriented rods. When the shelves are slid into abutting relation with the horizontally extending rods, the shelves' downwardly extending flanges will prevent the horizontally oriented rods, and hence the vertically oriented rods, from becoming disengaged from the shelves. Moreover, the engagement of one set of L-configured rods with each edge of each shelf systematically divides each shelf into four distinct article supporting regions.

In addition to the single, L-shaped, horizontally extending rods which abut the bottoms of the shelves, two other L-shaped, horizontally extending rods are bridged together by a short, vertically extending rod and welded to the groups of vertically extending rods in vertically spaced relation to the other horizontally extending rods. These additional L-shaped rods prevent the books or video cassettes from being slid from one article supporting region to another.

The vertically extending rods are further securely retained to the shelves by an upper and a lower shelf. The upper and lower shelves are identical to the other shelves. However, the hole formed centrally through each shelf is utilized on the upper and lower shelves, whereas the hole in the other shelves are not utilized. The upper and lower shelves are positioned such that the flanges formed along their edges extend upwardly and downwardly, respectively, and engage the appropriately positioned horizontally extending, L-shaped rods. One essentially flat cover plate having dimensions about the same as the shelves and a hole formed centrally therethrough is positioned in covering relation to each of the upper and lower shelves, thereby enclosing the L-shaped rods in the defined space. The upper shelf does not necessarily need a cover plate as it includes a cap which sits in complete covering relation thereto. The cover plates (and cap) are securely retained in abutting relation to the flanged ends of the upper and lower shelves by screws which pass through the holes formed through each. A nut is operatively positioned below the upper shelf and above the lower shelf to maintain the contacting relation between the cover plate and shelves.

In addition to passing through the plates and shelves, the screws also pass through upper and lower spindles attached to the upwardly facing surface of the upper shelf and the downwardly facing surface of the lower shelf, respectively. The spindles permit the tower to rotate about the vertically extending axis which passes through the screws, and hence, centrally through the shelves.

The assembled tower may be mounted to a framework, preferably rectangular in shape, with a pin attached to each of the upper and lower horizontal members engaging the upper and lower spindles, respectively, thereby securely, rotatably supporting the tower in the framework. A plurality of rectangular frameworks may be bracketed to one another in any desired manner. The brackets used may be of any desired angle, thereby permitting various configurations of towers to be arranged.

BRIEF DESCRIPTION OF THE DRAWINGS

The present invention will be more fully understood and readily appreciated from the following Detailed Description read in conjunction with the accompanying drawings, wherein.

DETAILED DESCRIPTION

Figure 1:
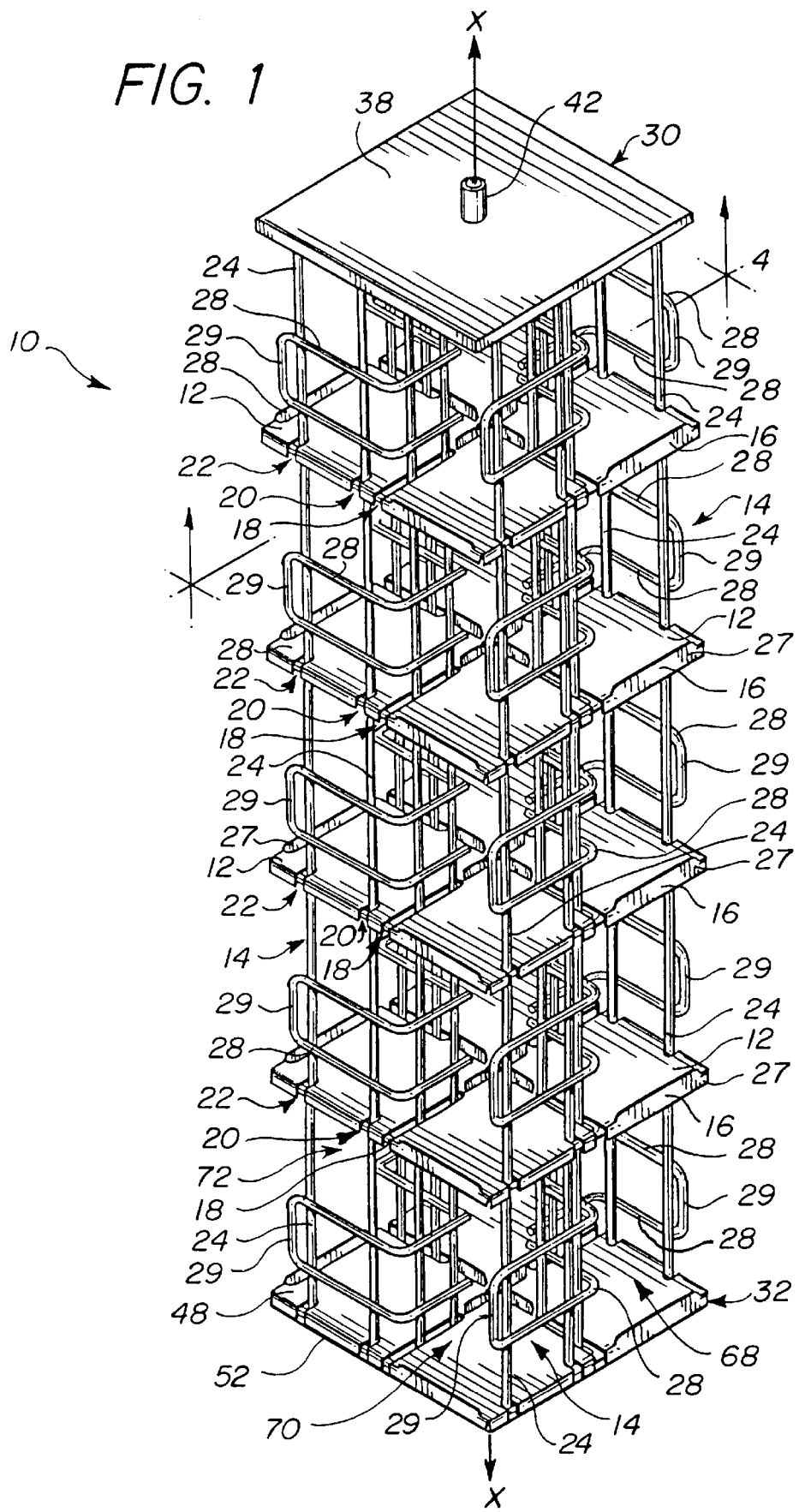
FIG. 1 is a perspective view of a tower.

Referring now to the drawings wherein like reference numerals refer to like parts throughout, there is seen in FIG. 1 a tower, denoted generally by reference numeral 10, rotatable about a central, vertically extending axis X—X, and for use in displaying and supporting articles such as books, video cassettes, or the like in a library-type setting. The articles are supported on a plurality of square shelves 12 which extend in horizontal planes in vertically spaced relation to one another. Shelves 12 are supported by groups of vertically extending rods, denoted generally 14, interconnected in L-shaped configurations (see FIG. 7 for one such group). The structural relationship between shelves 12 and the groups of rods 14 provide the structural rigidity and strength to tower 10 without the need for extraneous fasteners such as screws and the like, as will be explained hereinafter.

Shelves 12 are stamped from stock sheet metal into essentially square platforms with flanges 16 formed along their edges and extending essentially perpendicularly downwardly therefrom when tower 10 is assembled. Elongated slots 18 are formed from the midpoint of each edge of each shelf 12 inwardly towards the geometric center of each shelf 12, terminating at a point slightly more than midway between the edge and the center. A pair of notches 20, 22 are also formed in each edge of each shelf 12 at predetermined distances apart from one another and to one side of, and at predetermined distances from slot 18 (e.g., both notches 20, 22 formed to either the right or left of slot 18). It is important that all pairs of notches 20, 22 be formed to the same side of slot 18 (i.e., all notches 20, 22 are formed to either the right or left of slot 18). Slot 18 and notches 20, 22 are spaced and formed to cooperatively receive L-configured groups of rods 14 therein.

Also formed into shelves 12 are elongated slots 25 that extend parallel to each edge for a distance that is a portion of the way along the edge on the opposing side of slots 18 as notches 20 and 22. Formation of slots 25 result in upwardly extending flanges 27 formed along the edges adjacent slots 25. Flanges 27 prevent articles from being slid unimpeded off of shelves 12, thus requiring that a person removing an article, such as a video cassette 84, lift the article over flange 27 in order to remove it from a shelf 12.

Figure 7:
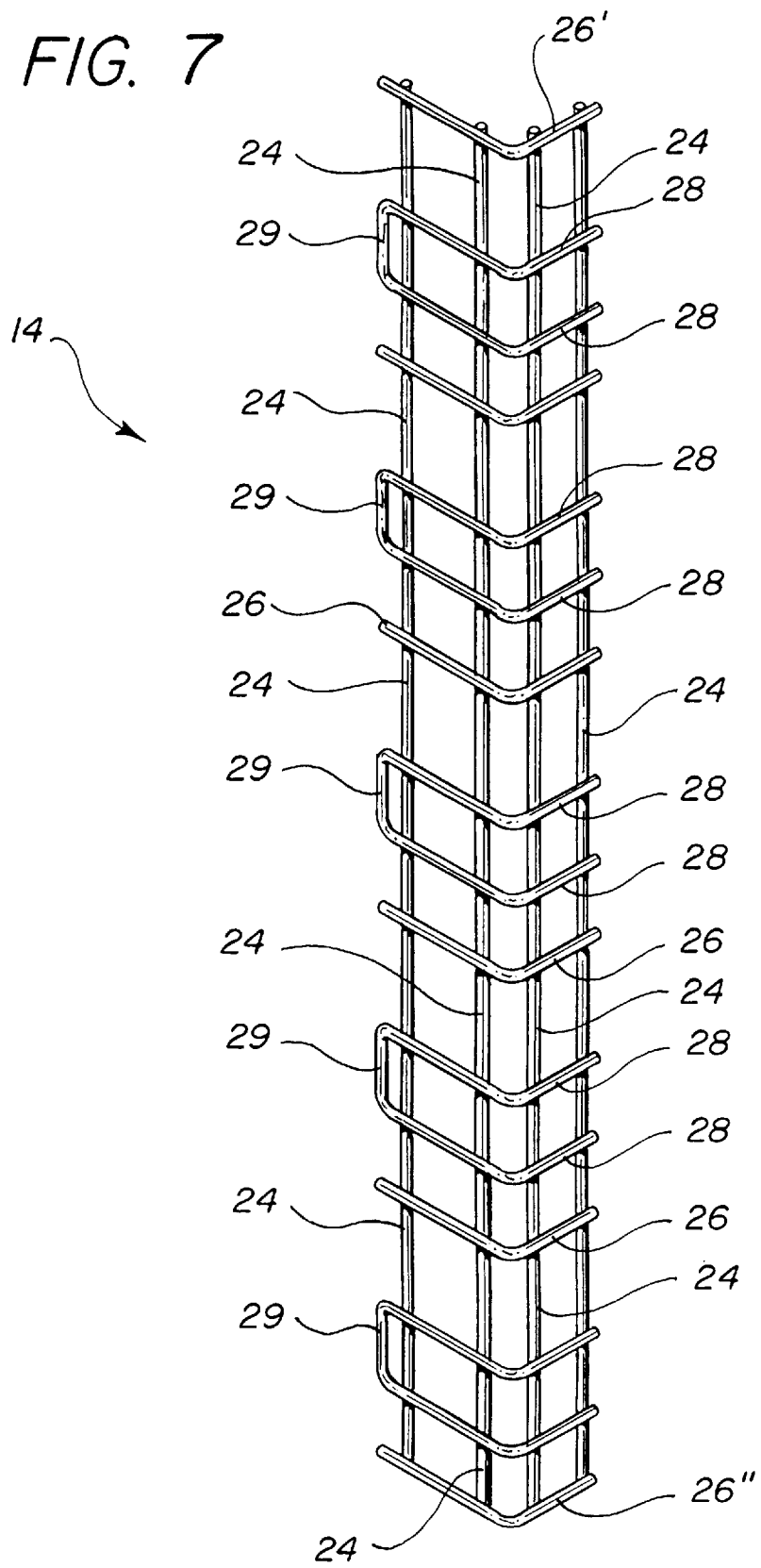
FIG. 7 is a perspective view of one L-configured group of vertically extending rods.

With particular reference to FIG. 7, L-configured groups of rods 14 are formed from elongated, vertically oriented rods 24 interconnected in spaced, parallel relation to one another by a plurality of horizontally oriented, L-shaped rods 26 which are welded in perpendicular relation to rods 24 and in parallel, vertically spaced relation to one another along the entire length of rods 24. Two of rods 24 are welded to each leg of the L-shaped rods 26, thereby forming the L-configured group of rods 14. The lateral spacing between the rods 24 mounted to the longer leg of rod 26 is equal to the distance separating notches 20 and 22, and the lateral spacing between the rod 24 attached to the shorter leg of rod 26 and the interior rod 24 attached to the longer leg 26 is equal to the distance separating notch 20 and slot 18. In addition, the length of the shorter leg of rod 26 is about the same as the length of slot 18, and the length of the longer leg of rod 26 is slightly less than one half the length of any edge of shelf 12.

To assemble tower 10, a shelf 12 is first slid into engaging relation with a group of L-configured rods 14 such that the two rods 24 attached to the shorter leg of rods 26 engage slot 18 and that one of the two rods 24 attached to the longer leg of rods 26 engages the correspondingly positioned notch 20 and 22. The rods 24 should be fully positioned within appropriate slot 18 or notches 20 and 24 such that the innermost of rods 24 engaging slot 18, and each of rods 24 engaged with notches 20 and 22 abut the terminal edge of slot 18 and notches 20 and 22. Hence, it is important, but not vital, that slot 18 be longer than notches 20 and 22. The additional shelves 12 are then engaged with the first group of L-configured rods 14 in spaced relation along the length of rods 26. The spacing of shelves 12 along rods 26 must be such that at least one rod 28 is disposed between adjacently positioned shelves 12. In the drawings, two rods 28 bridged together at the terminal ends of their longer leg by a vertically extending rod 29 are illustrated as being disposed between adjacent shelves 12. While this is the preferred embodiment, as it provides a larger structure for articles positioned on shelves to abut, it is only necessary to have one rod 28 disposed between adjacent shelves 12.

Once each shelf 12 is appropriately positioned along one group of L-configured rods 14, the other sets of rods 14 may be slid into engaging relation with the corresponding notches 20, 22 and slot 18 of each shelf 12, with the end result being one group of L-configured rods engaging the notches 20, 22 and slot 18 formed in each edge of each shelf 12. After all shelves 12 and groups of L-configured rods 14 are positioned in engaging, perpendicularly extending relation with one another, each shelf 12 may be slid along rods 26 until the rods 26 positioned directly below each shelf 12 abut the bottom surface 21 and flanges 16 of each shelf 12. Accordingly, the structural relation between rods 26, and hence rods 24, and shelves 12, particularly flanges 16, prevents L-configured rods 14 from becoming freely disengaged from shelves 12, thereby providing rigidity and stability to tower 10.

Figure 2:
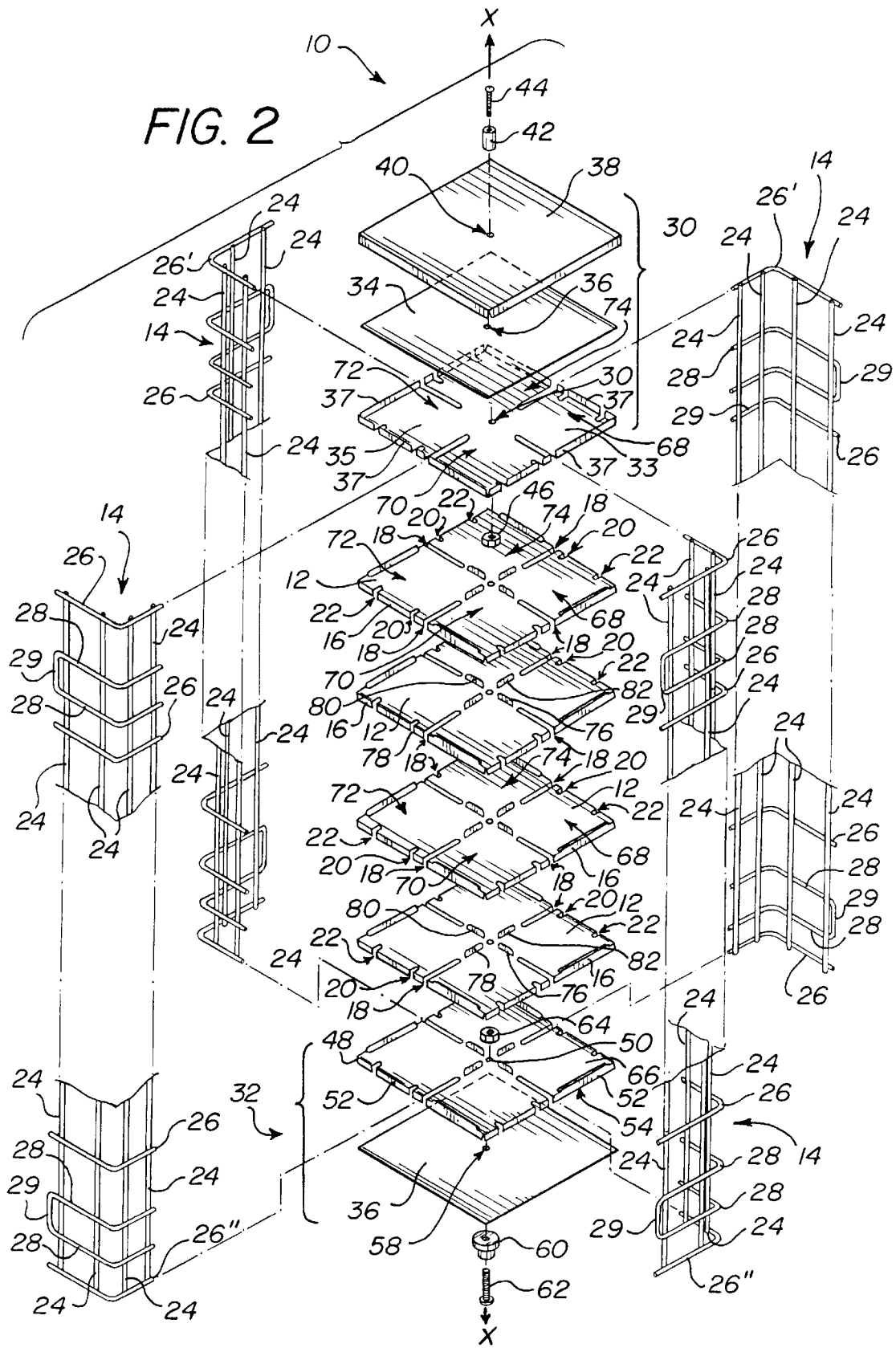
FIG. 2 is an exploded perspective thereof, with the vertically extending rods being partially fragmented.
Figure 3:
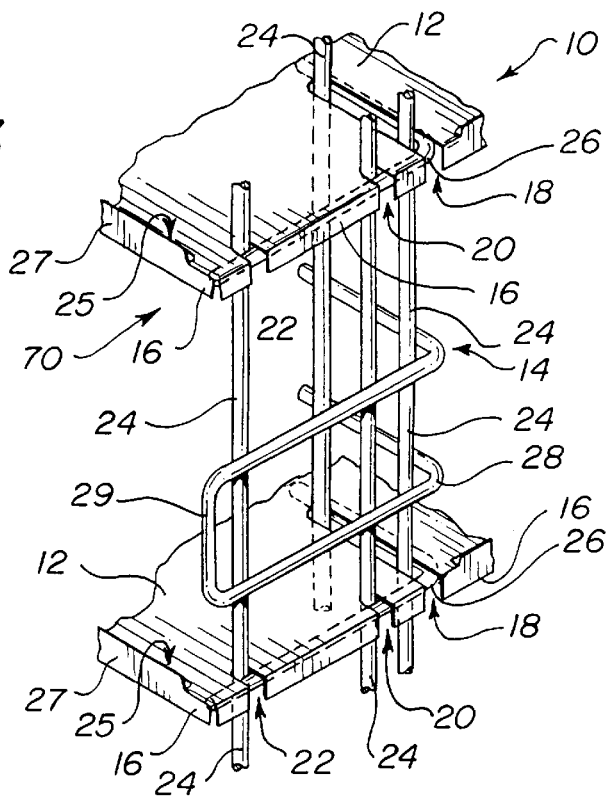
FIG. 3 is a fragmentary, enlarged perspective view of a portion of the tower.
Figure 4:
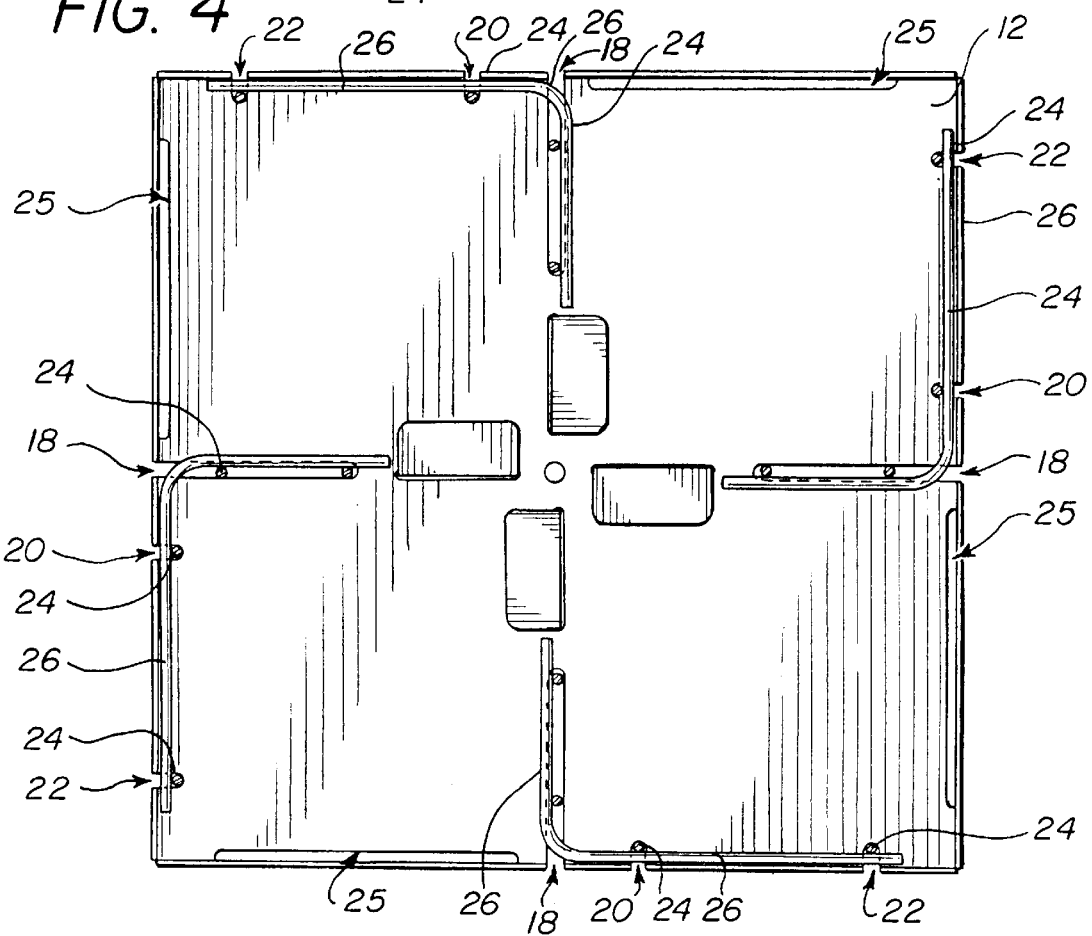
FIG. 4 is a cross-sectional view taken along section line 4—4 of FIG. 1.

To further rigidify and stabilize tower 10, top and bottom assemblies 30 and 32, respectively, are attached to groups of rods 14. With particular reference to FIG. 2, top assembly 30 includes shelf unit 33 (identical to shelves 12) having a screw hole 30 formed centrally therethrough, and positioned in an inverted relation to the other shelves 12 such that its flanges 37 extend upwardly and the upper-most set of rods 26 abut the upwardly facing surface 35 and flanges 37 of shelf unit 33. A cover plate 34 having essentially identical dimensions as shelf unit 33 and a screw hole 36 formed centrally therethrough may then be positioned in covering relation over surface 35 of shelf unit 33, although it is not absolutely necessary, thereby enclosing the uppermost rods 26' between cover plate 34 and surface 35 of shelf unit 33. Finally, assembly 30 includes a cap 38 having a screw hole 40 formed centrally therethrough which is snugly set in covering relation over cover plate 34 and shelf unit 33. A spindle 42 is then positioned atop cap 38 and a screw 44 is placed through spindle 42, and holes 30, 36 and 40. A nut 46 is then threaded onto the end of screw 44 until it firmly abuts the downwardly facing surface 45 of shelf unit 33, thereby tightening and securing top assembly 30 to L-configured groups of rods 14.

Bottom assembly 32 includes a shelf unit 48 (identical to shelves 12) having a screw hole 50 formed centrally therethrough, and positioned with its flanges 52 directed downwardly and the lower-most set of rods 26" abutting the downwardly facing surface 54 and flanges 52 of shelf unit 48. A cover plate 56 having dimensions essentially identical to shelf unit 48 and a screw hole 58 formed centrally therethrough is then positioned in covering relation over surface 54 of shelf unit 48, thereby enclosing the lower-most rods 26" in the space defined by cover plate 56 and shelf unit 48. A spindle 60 is positioned on the outwardly (downwardly) facing surface of cover plate 56 in aligned relation with holes 50 and 58, and a screw 62 is placed through spindle 60 and then holes 58 and 50. A nut 64 is then threaded onto the end of screw 62 until it firmly abuts the upwardly facing surface 66 of shelf unit 48, thereby tightening and securing bottom assembly 32 to L-configured groups of rods 14.

Figure 5:
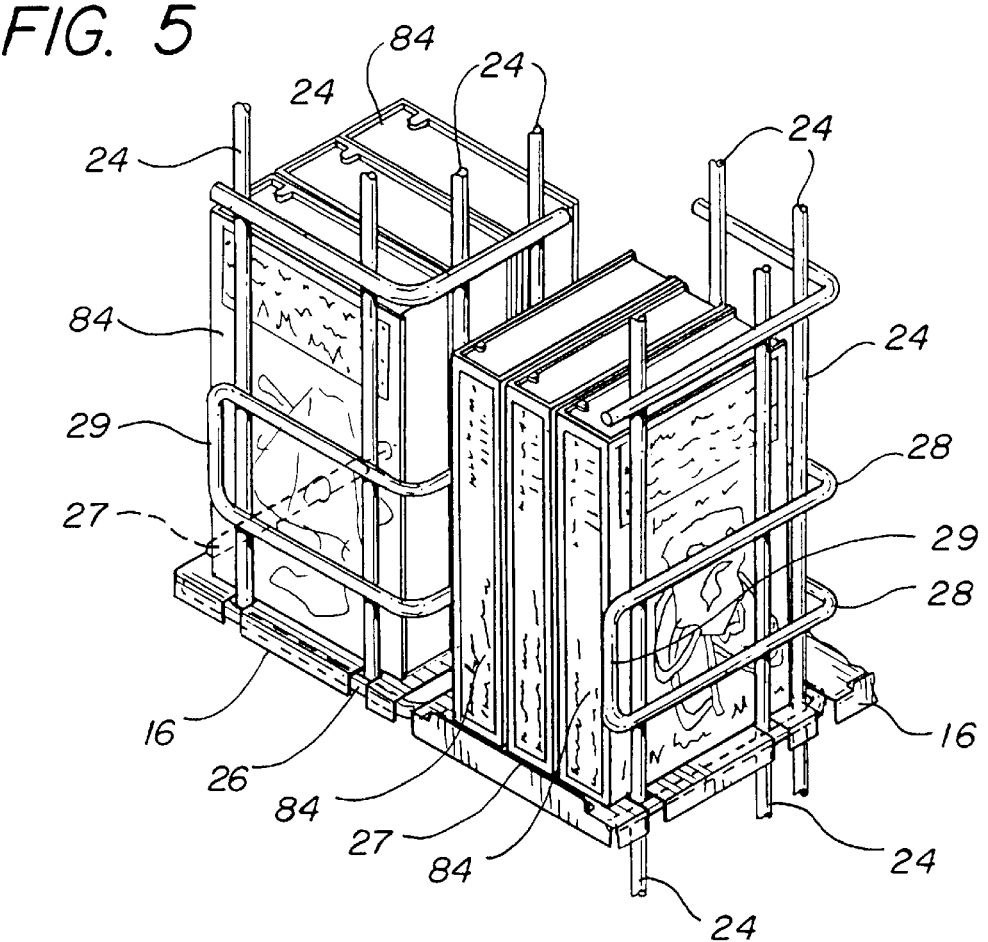
FIG. 5 is a fragmented perspective view of one level of the tower showing video cassettes supported on a shelf for illustrative purposes.
Figure 6:
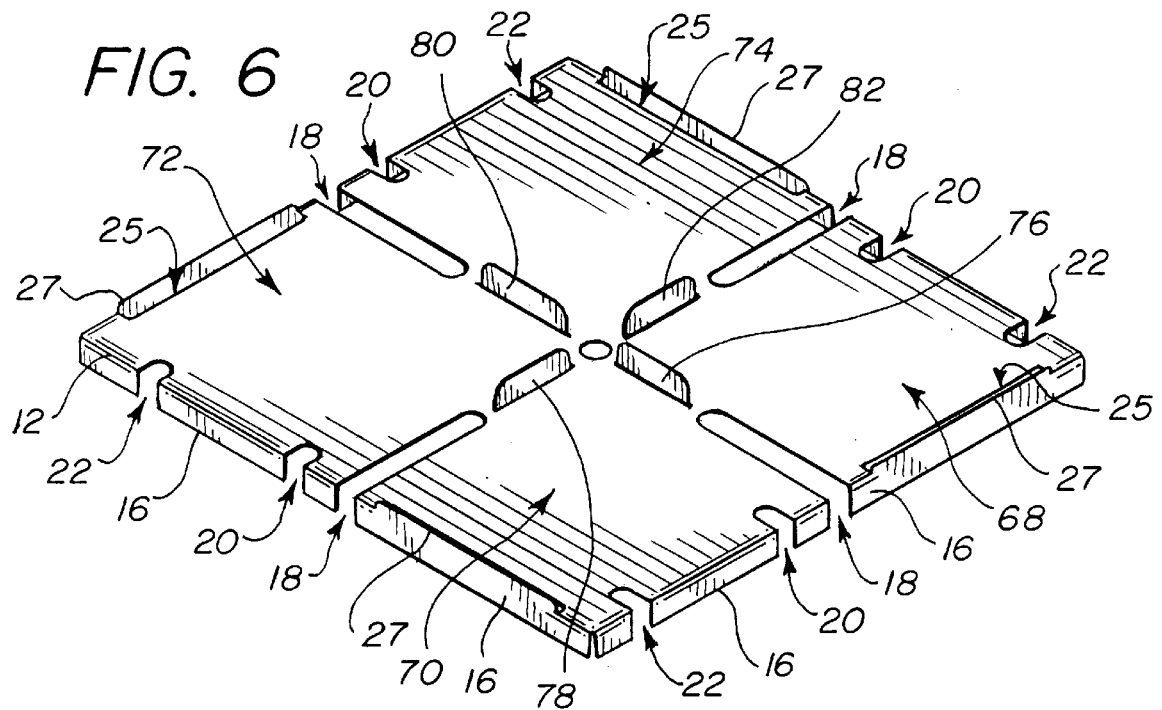
FIG. 6 is a perspective view of a shelf.

In its fully assembled condition, the engagement of one L-configured group of rods 14 with the slots 18 and notches 20, 22 formed in each edge of shelves 12 provides not only the structural rigidity and stability of tower 10, but also provides the definition of division of each shelf 12 into four distinct, article supporting regions, denoted generally by reference numerals 68, 70, 72 and 74. Regions 68, 70, 72 and 74 are further defined by tabs 76, 78, 80 and 82 which are integrally formed on, and protrude upwardly from the upwardly facing surface of each shelf 12 (and shelf unit 48). Tabs 76, 78, 80 and 82 are positioned adjacent the geometric center of each shelf 12 and in longitudinally aligned relation with the slot 18 formed inwardly from each edge of each shelf 12 (and shelf 48). In addition to rods 28 and 29, tabs 76, 78, 80 and 82 also prevent articles, such as video cassettes 84 (see FIG. 5), from being slid from one region (region 68 for example) into another region (region 70 for example).

Figure 8:
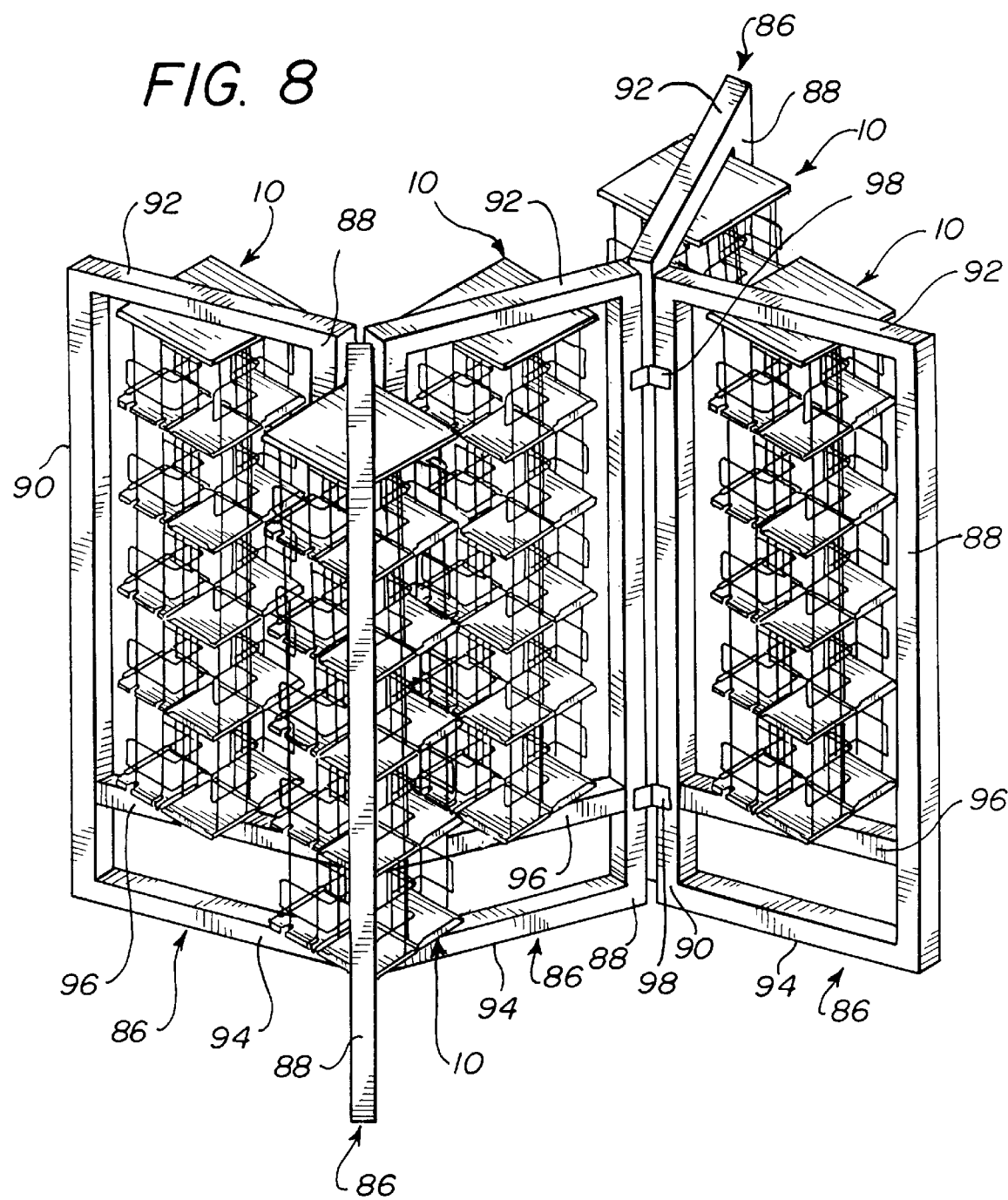
FIG. 8 is a perspective view of an assembled tower display unit arranged in a bow-tie configuration.

With reference to FIG. 8, once a tower 10 is fully assembled, it may be rotatably mounted to a framework denoted generally by reference numeral 86. Each framework 86 is essentially rectangular in shape and consists of two members 88 and 90 extending vertically in spaced, parallel relation to one another and bridged to one another at their terminal ends by upper and lower, horizontally extending members 92 and 94, respectively. Vertical members 88 and 90 are illustrated as being bridged together at their terminal ends, but they could be bridged together at any other appropriate positions along their length. The length of members 92 and 94, and hence the distance separating members 88 and 90, must be greater than the maximum dimension of each shelf 12 (i.e., the diagonal dimension of each shelf 12) in order to ensure that tower 10 will freely rotate about vertical axis X—X without interference from framework 86. In addition to members 92 and 94, framework 86 includes an intermediate member 96 (as illustrated) horizontally extending between vertical members 88 and 90 and in vertically spaced relation to and between members 92 and 94. The vertical distance between intermediate member 96 and upper member 92 is essentially equal to the height of tower 10 as measured from the outward end of spindle 42 to the outward end of spindle 60 (les than about 1 inch in difference). To mount tower 10 to framework 86, spindle 42 is inserted into a hole formed in the bottom surface of upper member 92, and spindle 60 is then positioned over a hole (not shown) formed in the upper surface of intermediate member 96. Tower 10 is then lowered to rest on the shoulder of spindle 60.

A plurality of frameworks 86 may be interconnected to one another in a variety of configurations by means of angle brackets 98 attached to members 88 (and/or) 90 of two adjacent frameworks 86. As seen in FIG. 8, two frameworks 86 may extend from one member 88 of a third framework 86. Alternatively, it may be desirable to have only one framework attach to a second framework. Despite the configuration of towers chosen, the use of brackets 98 having desired angles does permit the arrangement to be custom tailored to a specific need.

What is claimed is:

1. A tower having a central, vertically extending axis for use in displaying video cassettes, books, and like articles, comprising:

a) a plurality of article supporting shelves positioned in vertically spaced relation to one another and extending in respective horizontal planes, radially outwardly from said vertically extending axis, each of said shelves having opposite upwardly and downwardly facing surfaces, a predetermined periphery defined by a plurality of edges;

b) said plurality of edges each including a respective, first elongated slot extending radially inwardly therefrom each along a respective first longitudinal axis, each of said first elongated slots being of substantially identical, first predetermined lengths, said plurality of edges each further including at least one respective notch formed therein and positioned adjacent to one side of and at respective, predetermined lateral distances from said first elongated slots, with each of said at least one notch extending along a respective, second longitudinal axis and in essentially parallel relation to said adjacent first elongated slot, each of said at least one notch being of a second predetermined length shorter than said first predetermined length; and c) shelf supporting means including at least one first vertically extending member each of which is physically positioned within said at least one elongated slot, and a first plurality of essentially horizontally extending members each fixedly attached in vertically spaced, perpendicularly extending relation to said at least one vertically extending members, and at least one of said first plurality of horizontally extending members being positioned in supporting relation to said downwardly facing surface of each of said shelves.

2. The tower according to claim 1 wherein said article supporting shelves are rectangular in shape, thereby having four defined edges.

3. The tower according to claim 1 wherein said first plurality of horizontally extending members and said at least one first vertically extending member are elongated rods.

4. The tower according to claim 1 wherein said first plurality of essentially horizontally extending members are L-shaped having a first leg of third predetermined distance and a second leg of fourth predetermined distance, longer than said third predetermined distance, integrally extending at a right angle to said first leg, said first and second legs each having one terminal end.

5. The tower according to claim 4 wherein said shelf supporting means includes at least one of said first vertically extending members fixedly attached to each of said first and second legs of several of said first plurality of horizontally extending members, each of said first vertically extending members extending in parallel relation to one another, and said first vertically extending members attached to said first and second legs being laterally spaced from each of those first vertically extending members attached to said second leg distances essentially equal to said predetermined, lateral distances separating said first elongated slot from said at least one notch, whereby each of said vertically extending rods may be physically positioned within either of said first elongated slot and each of said at least one notch, whereby each of said shelves is divided into four article supporting regions.

6. The tower according to claim 5 wherein one of said at least one vertically extending rods attached to said first leg is positioned adjacent said terminal end of said first leg.

7. The tower according to claim 6 wherein said first predetermined length of said first leg is about the same as said first predetermined length of said first elongated slot.

8. The tower according to claim 7 wherein each of said plurality of article supporting shelves includes a flange extending downwardly along the entire length of each of said four edges.

9. The tower according to claim 8 wherein each one of said second legs of said first plurality of horizontally extending members is positioned in supporting relation to a downwardly facing surface of one of each of said shelves and in abutting relation to one of said flanges.

10. The tower according to claim 9 wherein each of said plurality of article supporting shelves includes a respective second elongated slot formed therethrough, and positioned adjacent and parallel thereto on the opposite side of said first elongated slots as said at least one notches are formed.

11. The tower according to claim 10 wherein each of said edges includes a flange extending upwardly therefrom, said flange extending adjacent to and along the entire length of said second elongated slot, whereby said upwardly directed flanges prevent said articles from being unimpededly slid off one of said shelves.

12. The tower according to claim 11 wherein said tower is mounted within a rectangular framework and is rotatable about its said central, vertically extending axis.

13. The tower according to claim 12 wherein each of said plurality of shelves includes means for preventing said articles from freely passing from one of said articles supporting regions to another of said article supporting regions.

14. The tower according to claim 13 wherein said means for preventing said articles from freely passing from one of said article supporting regions to another includes at least four tabs extending upwardly from said upwardly facing surface, each one of said tabs being position co-linear with one of said first elongated slots and adjacent the geometric center of each of said shelves, whereby said tabs prevent said articles from passing from one of said article supporting regions to another.

15. The tower according to claim 13 wherein said means for preventing said articles from passing from one article supporting region to another includes a second plurality of L-shaped, horizontally extending members essentially identical to said first plurality of horizontally extending members, wherein each of said second plurality of horizontally extending members is fixedly attached to at least two of said vertically extending members with those second horizontally extending members that are attached to the same at least two first vertically extending members being positioned in vertically spaced relation to one another and with at least one of said second horizontally extending members being positioned between adjacent first horizontally extending members, whereby said second horizontally extending members prevent said articles from being slid from one article supporting region to another.

16. The tower according to claim 15 wherein at least two of said second plurality of horizontally extending members are positioned between two adjacent of said first plurality of X horizontally extending members and are vertically spaced from one another a predetermined, vertical distance, and the two of said second horizontally extending members are integrally joined together by a second vertically extending member having a length essentially equal to said predetermined vertical distance.

17. The tower according to claim 1 wherein each of said plurality of article supporting shelves includes a flange extending downwardly along the entire length of each of said four edges.

18. The tower according to claim 1 wherein each of said plurality of article supporting shelves includes a second elongated slot formed therethrough, and positioned adjacent and parallel to each of said four edges on the opposite side of said first elongated slots as said at least one notches are formed.

19. The tower according to claim 18 wherein each of said edges includes a flange extending upwardly therefrom, said flange extending adjacent to and along the entire length of said second elongated slot, whereby said upwardly directed flanges prevent said articles from being unimpededly slid off one of said shelves.

20. The tower according to claim 1 wherein each of said plurality of shelves includes means for preventing said articles from freely passing from one of said articles supporting regions to another of said article supporting regions.

21. The tower according to claim 20 wherein said means for preventing said articles from freely passing from one of said article supporting regions to another includes at least four tabs extending upwardly from said upwardly facing surface, each one of said tabs being position co-linear with one of said first elongated slots and adjacent the geometric center of each of said shelves, whereby said tabs prevent said articles from passing from one of said article supporting regions to another.

22. The tower according to claim 2 wherein said tower is mounted within a rectangular framework and is rotatable about its said central, vertically extending axis.

23. The tower according to claim 17 wherein a plurality of said rectangular frameworks are interconnected to one another by hinges, whereby any desired configuration of frameworks may be assembled.

24. The tower according to claim 1 wherein said tower is mounted within a rectangular framework and is rotatable about its said central, vertically extending axis.

25. The tower according to claim 24 wherein a plurality of said rectangular frameworks are interconnected to one another by hinges, whereby any desired configuration of frameworks may be assembled.

26. A shelf having opposite first and second planar surfaces for use in supporting video cassettes, books, and like articles on said first surface, comprising:
   a) a predetermined periphery defined by a plurality of edges;
   b) at least one notch formed in said shelf in laterally spaced relation to one side of said first elongated slot, and extending radially inwardly from each of said at least one edge, said at least one notch having a second, predetermined length and
   c) said plurality of edges including a respective first elongated slot extending radially inwardly therefrom along a first longitudinal axis, said first elongated slot being of a first predetermined length, and each of said plurality of edges further including at least one notch formed therein, respectively, positioned adjacent to one side of and at respective, predetermined, lateral distances from said first elongated slots, and extending along a respective second longitudinal axis and in essentially parallel to said adjacent, first elongated slot, each of said at least one notch being of a second predetermined length, shorter than said first predetermined length.

27. The tower according to claim 26 wherein said article supporting shelves are rectangular in shape, thereby having four defined edges.

28. The tower according to claim 27 wherein each of said plurality of article supporting shelves includes a flange extending downwardly along the entire length of each of said four edges.

29. The tower according to claim 28 wherein each of said plurality of article supporting shelves includes a respective second elongated slot formed therethrough, and positioned adjacent and parallel thereto on the opposite side of said first elongated slots as said at least one notches are formed.

30. The tower according to claim 29 wherein each of said edges includes a flange extending upwardly therefrom, said flange extending adjacent to and along the entire length of said second elongated slot, whereby said upwardly directed flanges prevent said articles from being unimpededly slid off of one of said shelves.

31. The tower according to claim 30 wherein each of said plurality of shelves includes means for preventing said articles from freely passing from one of said articles supporting regions to another of said article supporting regions.

32. The tower according to claim 31 wherein said means for preventing said article supporting regions to another includes at least four tabs extending upwardly from said upwardly facing surface, each one of said tabs being position co-linear with one of said first elongated slots and adjacent the geometric center of each of said shelves, whereby said tabs prevent said articles from passing from one of said article supporting regions to another.

* * * * *